United States Patent
Hudson et al.

[11] Patent Number: 6,043,937
[45] Date of Patent: Mar. 28, 2000

[54] HEAD UP DISPLAY SYSTEM USING A DIFFUSING IMAGE PLANE

[75] Inventors: Mark William Hudson, Russiaville, Ind.; Ning Wu, Rancho Palos Verdes, Calif.; Doyle Joseph Groves; Timothy James Newman, both of Noblesville, Ind.; Dale James Igram; Jianhua Li, both of Kokomo, Ind.; Gerald Jay Witt, Carmel, Ind.; Mark Anthony Koors, Kokomo, Ind.; Mark Robert Vincen, Noblesville, Ind.

[73] Assignee: Delphi Technologies, Inc., Troy, Mich.

[21] Appl. No.: 09/266,378

[22] Filed: Mar. 11, 1999

[51] Int. Cl.[7] .............................. G02B 27/14; F21V 13/02
[52] U.S. Cl. ........................... 359/630; 359/631; 362/494
[58] Field of Search ................................... 359/630, 631; 362/494

[56] References Cited

U.S. PATENT DOCUMENTS

| | | | |
|---|---|---|---|
| 4,835,661 | 5/1989 | Fogelberg et al. | 362/97 |
| 5,701,132 | 12/1997 | Kollins et al. | 345/8 |
| 5,729,242 | 3/1998 | Margerum et al. | 345/7 |

*Primary Examiner*—Georgia Epps
*Assistant Examiner*—Saud Seyrafi
*Attorney, Agent, or Firm*—Jimmy L. Funke

[57] ABSTRACT

A head up display system having a diffusing image plane or diffuser. The light output of a relatively small image source is imaged on the diffuser by way of imaging optics. A mirror is used to image light from the diffuser onto a windshield and correct for distortion caused by the windshield. The diffuser is advantageously used when a large field-of-view is desired, or sun load characteristics need to be addressed. The diffuser may be flat or curved in order to optimize the system for different applications. The magnification of the mirror may be made relatively low, and the solar energy density that is made incident on the image source is reduced, providing for a low cost, high performance, color head up display system.

9 Claims, 2 Drawing Sheets

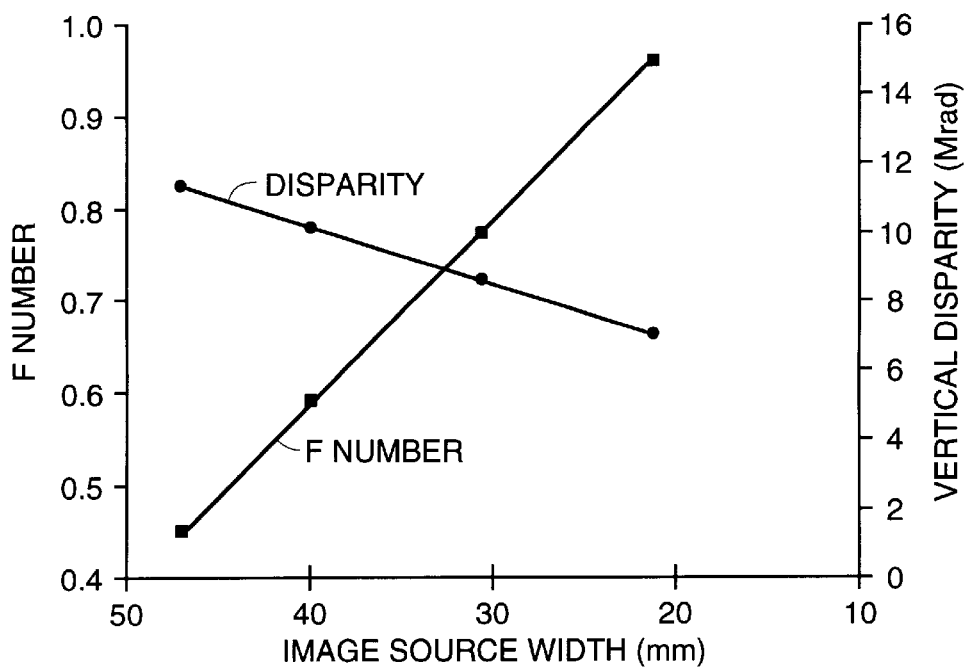
Fig. 1
Fig. 2
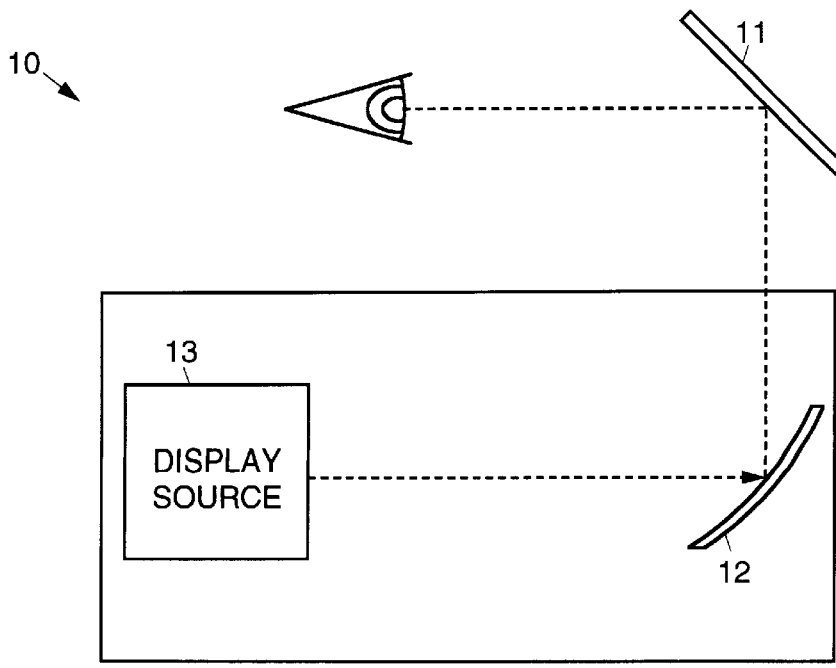

HEAD UP DISPLAY SYSTEM USING A DIFFUSING IMAGE PLANE

BACKGROUND

The present invention relates generally to head up display systems, and more particularly, to an improved head up display system having a diffusing image plane.

As the field-of-view (FOV) requirement of a head up display increases, the size of the image source tends to increase in order to keep a lower optical system magnification. Unfortunately, the image source size is desired to be as small as possible to reduce cost of the image source and associated packaging.

As image sources become smaller, the optical system needs to increase magnification and is challenged in producing a minimally distorted image. The magnification increase can produce an unacceptable sun load condition presented to the image source as well.

Sun load is a calculated energy irradiance value expressed in watts/cm$^2$. The heating of the image source is due to the focusing of the sun's energy upon its surface. Should the magnification of the optical system be high enough to produce an excessive sun load condition the image source will be damaged.

Optical system performance also suffers in conventional systems when using small image sources. For a typical 10° horizontal field-of-view (HFOV) head up display with an eye box of 73.5 mm in width, the relationship among vertical disparity error (the worst error within field-of-view and eye box), optical system f-number versus the horizontal dimension of the image source are shown in FIG. 1. As can be seen from FIG. 1, as the image width drops below 50 mm, the vertical disparity error increases quite rapidly.

A driver has the ability to tolerate vertical disparity from 1 to 9 mrad, otherwise double vision can occur. The vertical disparity error will stay about 1 mrad when the image source width is kept greater than 50 mm. The corresponding f-number of the optical system should stay above 0.8 to maintain a reasonable package size.

Therefore, the use of conventional optics, the size of the image source should be greater than 50 mm in width. A cost penalty is now realized due to the inability to use smaller than 50 mm. wide image sources (for this example).

A solution is needed to allow the use of small cost effective image sources, which also meets head up display optical performance requirements. The use of a diffusing image plane or diffuser is the solution that is provided by the present invention. It would therefore be desirable to have a head up display system employing a diffuser that eliminates problems associated with conventional designs.

SUMMARY OF THE INVENTION

The present invention provides for an improved head up display system having a diffusing image plane or diffuser. The present diffusing image plane head up display system comprises a windshield, an image or display source, and a mirror disposed between the windshield and image source. The diffuser comprises a diffusing image plane that is disposed between the mirror and the image source. The diffuser may be flat or curved in order to optimize the system for different applications. Imaging optics are also disposed between the diffuser and the image source that image the output of the image source onto the diffuser. In addition, application optics may be disposed between the diffuser and the mirror, as required, for a particular vehicle application, to address specific imaging requirements.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a graph illustrating f-number and disparity versus source width;

FIG. 2 illustrates a typical automotive head up display system;

DETAILED DESCRIPTION

Figure 3:
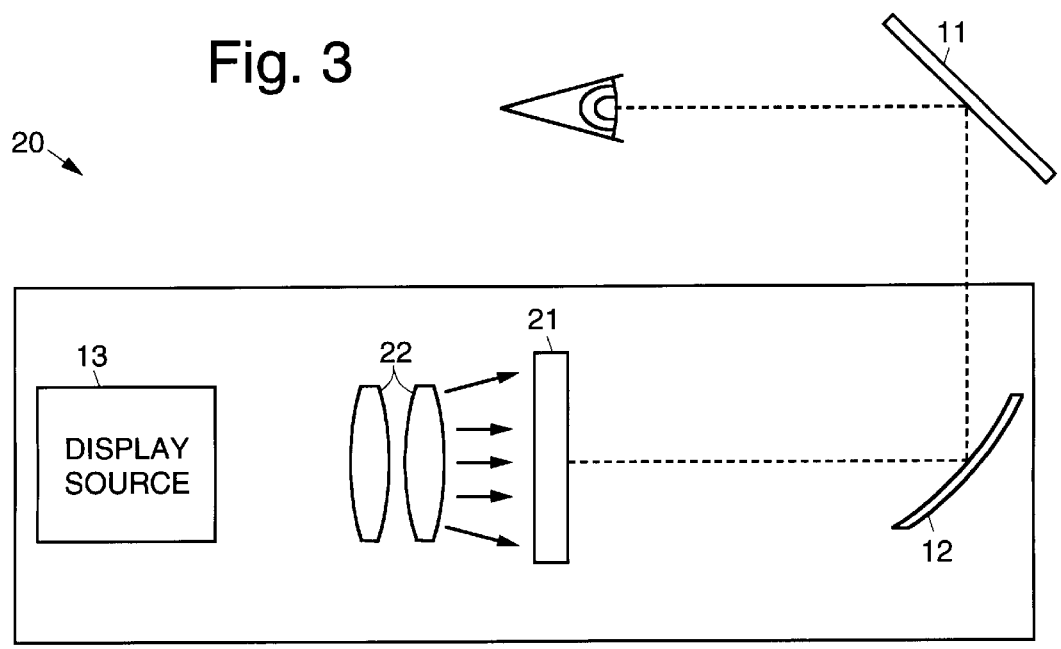
FIG. 3 illustrates a front surface view of an exemplary diffusing image plane head up display system in accordance with the principles of the present invention.

Referring again to the drawing figures, a conventional vehicular or automotive head up display system 10 is shown in FIG. 2. The head up display system 10 comprises a windshield 11, a mirror 12 and an image or display source 13. Application optics, such as the mirror 12, for example, optically interfaces directly between the windshield 11 and the image source 13. The optical design, sun load characteristics and performance of the conventional head up display system 10 are a result of the size of the image source 13 versus the required field-of-view of the head up display system 10 and performance requirements. As was discussed above, this conventional head up display suffers from sun loading problems.

Figure 4:
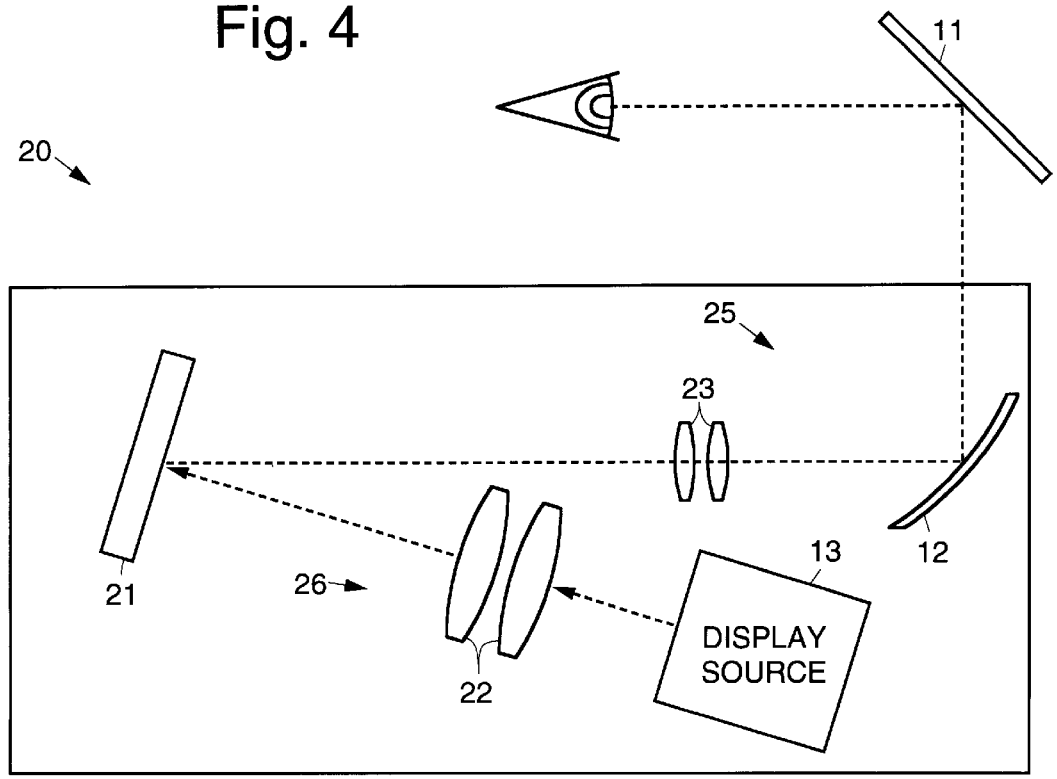
FIG. 4 illustrates a rear surface view of the exemplary diffusing image plane head up display system.

When a large field-of-view is desired, or the performance and sun load characteristics are unacceptable, a diffuser 21 or diffusing image plane 21 in accordance with the principles of the present invention may be used, as is depicted in FIGS. 3 and 4. FIGS. 3 and 4 illustrate front and rear surface views, respectively, of an exemplary diffusing image plane head up display system 20 in accordance with the principles of the present invention.

The diffusing image plane head up display system 20 comprises a windshield 11 which is viewed by a driver and a curved or focusing mirror 12 disposed to focus an image on the windshield 11. The diffuser 21, or diffusing image plane 21, is disposed between the mirror 12 and an image or display source 13 substantially at a focus of the mirror 12. Imaging optics 22 are disposed between the diffuser 21 and the image source 13 that image the output of the image source 13 onto the diffuser 21. In addition, application optics 23 may be disposed between the diffuser 21 and the mirror 12, as required, for a particular vehicle application, to address specific imaging requirements and to provide a specific field of view for the system.

The image or display source 13 projects an image on the diffusing plane 21, thus creating two optical subsystems 25, 26 within the head up display system 20. The first optical subsystem 25 uses conventional technology that employs the curved mirror 12 to correct for distortion caused by the windshield 11.

However, in the present system 20, the mirror 12 views the diffusing plane provided by the diffuser 21, not the smaller image source 13 as in a conventional system 10, thus reducing the magnification of the mirror 12 that is required to project an image onto the windshield 11.

By allowing the magnification of the mirror 12 to be lower, the solar energy density that is made incident on the image source 13 can be reduced by increasing the area to be illuminated. This also maintains the f-number of the mirror needed to maintain an acceptable image as was discussed in the Background section. The second optical system 26 uses a small display source 13 along with additional imaging optics 22 to project the image onto the diffuser 21.

The problem of sun load is defeated by use of the diffuser 21 or diffusing image plane 21 to prevent focused sun energy from coming in direct contact with the image source 11. As mentioned earlier, the sun can damage the image source 13 if its energy is allowed to focus directly on it. The present diffusing image plane head up display system 20 allows the energy to be diffused by the diffuser 21 over a relatively large area, thus allowing less solar energy to be passed to the image source 13.

A calculation of the sun load on the image source 13 used in a conventional head up display system 10 and the present diffusing image plane head up display system 20 are presented in the table below. This illustrates the improved sun loading characteristics of the present system 20.

| Quantity | Conventional | Diffusing |
|---|---|---|
| Image source area | 968 mm$^2$ | 2009 mm$^2$ |
| Bond angle | 19 | 14 |
| Back focal distance | 158–39 mm | 167.7 mm |
| Mirror area | 80 mm × 220 mm | 96 mm × 248 mm |
| RMS spot radius | 5.16 mm | 7.98 mm |
| RMS spot area on image source | 0.84 cm$^2$ | 2.0 cm$^2$ |
| Solar radiant power on mirror | 9.1 Watts | 12.68 Watts |
| Energy passed to source | 100% | 95.80% |
| Energy percent in RMS | 60% | 49% |
| Energy irradiance | 6.5 watts/cm$^2$ | 2.98 watts/cm$^2$ |

The diffuser 21 provided by the present invention may be advantageously employed to produce a wide field-of-view color, low cost head up display systems 20. The diffuser 21 eliminates solar energy and cost limitations of conventional head up display systems 10. The use of the diffuser 21 allows for the use of a smaller image source 11 and eliminates many solar energy concerns.

It is to be understood that the surface shape of the diffusing plane 21 or diffuser 21 may be curved rather than flat to enable further advantages. The wavefront emanating from the imaging optics 22 (or projection optics) in the exemplary head up display system 20 is flat for most applications as is required by the typical surface on which the real image is formed, which is also flat. This flat wavefront requires imaging optics 22 that have more cost and complexity than a simpler system that would produce a curved wavefront.

However, the present head up display system 20 can take great advantage of a curved-surface diffusing plane 21 that is curved on both sides. As stated above, the real-image projection optics (imaging optics 22) can be greatly simplified and produced at a lower cost since there is a reduced requirement for field curvature towards flatness, while the front portion of the head up display system 20, comprising the application optics 23, which try to ultimately present a flat virtual image to the viewer, often require some amount of curvature in the image source to achieve consistent virtual image projection distance. When this distance is made uniform by optimizing the optical surfaces of the application optics 23, it is often at the expense of other performance parameters in the system 20, such as distortion, magnification variation and vertical disparity. Therefore, providing a curved surface on the diffusing plane facing the image source 13 improves the image quality and cost efficiency of the head up display system 20.

Thus, an improved head up display system employing a diffuser has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

We claim:

1. A head up display system comprising:

a windshield;

a mirror dispose d to focus an image on the windshield;

a diffuser disposed at a focus of the mirror;

an image source; and imaging optics disposed between the image source and the diffuser that images the output of the image source onto the diffuser.

2. The system recited in claim 1 further comprising application optics disposed between the diffuser and the mirror that provide a desired field of view for the system.

3. The system recited in claim 1 wherein the curved mirror corrects for distortion caused by the windshield.

4. The system recited in claim 1 wherein the diffuser is flat.

5. The system recited in claim 1 wherein the diffuser is curved.

6. A head up display system comprising:

a windshield;

a mirror disposed to focus an image on the windshield;

a diffuser disposed at a focus of the mirror;

an image source;

imaging optics disposed between the image source and the diffuser that images the output of the image source onto the diffuser; and application optics disposed between the diffuser and the mirror that provide a desired field of view for the system.

7. The system recited in claim 6 wherein the curved mirror corrects for distortion caused by the windshield.

8. The system recited in claim 6 wherein the diffuser is flat.

9. The system recited in claim 6 wherein the diffuser is curved.

\* \* \* \* \*